(12) United States Patent
Underwood et al.

(10) Patent No.: US 8,798,001 B2
(45) Date of Patent: Aug. 5, 2014

(54) MESSAGE ROUTING PLATFORM

(75) Inventors: John Anthony Underwood, Makati (PH); Christopher Edward Keys, Makati (PH); Markku Kero, Muntinlupa (PH); Rainer Leinonen, Makati (PH); Alvin Delagon, Laguna (PH)

(73) Assignee: 3rd Brand Pte. Ltd., Singapore (SG)

( * ) Notice: Subject to any disclaimer, the term of this patent is extended or adjusted under 35 U.S.C. 154(b) by 343 days.

(21) Appl. No.: 13/055,824

(22) PCT Filed: Jul. 29, 2009

(86) PCT No.: PCT/SG2009/000266
§ 371 (c)(1),
(2), (4) Date: Sep. 16, 2011

(87) PCT Pub. No.: WO2010/019105
PCT Pub. Date: Feb. 18, 2010

(65) Prior Publication Data
US 2012/0002601 A1 Jan. 5, 2012

(30) Foreign Application Priority Data
Aug. 13, 2008 (SG) .................................. 200805997

(51) Int. Cl.
*H04B 7/212* (2006.01)

(52) U.S. Cl.
USPC .......................................... 370/331; 370/328

(58) Field of Classification Search
USPC .............. 370/328, 351, 331, 389, 398, 395.3, 370/395.31, 395.32, 471, 474, 475, 476; 455/438, 404.2, 414.2, 433, 456.1, 455/432.3, 432.1, 456.2; 709/224
See application file for complete search history.

(56) References Cited

U.S. PATENT DOCUMENTS

| | | | |
|---|---|---|---|
| 7,496,678 B2 * | 2/2009 | Yadav et al. .................. 709/231 |
| 2003/0067903 A1 * | 4/2003 | Jorgensen .................... 370/338 |
| 2004/0062267 A1 * | 4/2004 | Minami et al. ................ 370/463 |
| 2006/0135159 A1 * | 6/2006 | Andersen et al. .......... 455/435.1 |
| 2006/0165015 A1 | 7/2006 | Melick et al. |
| 2006/0280166 A1 * | 12/2006 | Morris ......................... 370/352 |
| 2007/0147395 A1 * | 6/2007 | Chen et al. .................... 370/401 |
| 2007/0180123 A1 * | 8/2007 | Bennett ........................ 709/227 |
| 2009/0227276 A1 * | 9/2009 | Agarwal et al. .............. 455/466 |
| 2009/0296706 A1 * | 12/2009 | Zhang et al. .................. 370/389 |

FOREIGN PATENT DOCUMENTS

| WO | WO2006026435 | 3/2006 |
|---|---|---|
| WO | WO2008065531 | 6/2008 |

* cited by examiner

*Primary Examiner* — Gary Mui
(74) *Attorney, Agent, or Firm* — MKG LLC

(57) ABSTRACT

A system and method for routing messages in a communication network is disclosed. The system include a plurality of nodes for receiving a packet for delivery to an intended recipient wherein the system is adapted to determine if the intended recipient is connected to a first selected node within the plurality of nodes; and if the recipient is connected to the first selected node, deliver the packet; and if the recipient is determined not to be connected to the first selected node within the plurality of nodes, the system is further adapted to determine which node from the plurality of nodes the intended recipient is connected and forward the packet to the node to which the intended recipient is connected.

23 Claims, 4 Drawing Sheets

US 8,798,001 B2

MESSAGE ROUTING PLATFORM

FIELD OF THE INVENTION

The present invention application relates to systems and methods for routing information. In particular although not exclusively the present invention relates to routing messages and data in a mobile communications network.

DISCUSSION OF THE BACKGROUND ART

The ever increasing popularity of messaging and mobile data formats such as SMS, MMS, VOIP, email, instant messaging, video messaging, live video streaming etc place an ever increasing strain on network capacity. The increased traffic affects network efficiency. To improve data throughput many providers employ shaping wherein the data rate provided to various users who exceed set data usage limits is restricted.

The effects of increased data traffic are far more evident in many of the current mobile communications platforms. In essence as mobile technologies have advanced from first generation mobile device, to second and 2.5 generation and more recently third generation, data traffic has grown exponentially. This has been mainly due to the provision of additional bandwidth. However, the efficiency of data transfer over mobile networks is rate limited by the hardware components of the network. Not only does the hardware limit the data rate it also limits the amount of users any one node with the network can service at any particular time.

Given the ever increasing amount of data being placed on mobile communications networks there is clearly a need for a messaging system and method that is not only capable of handling present network data traffic but is also readily scalable to cater to increases in data.

SUMMARY OF THE INVENTION

In one aspect of the present invention there is provided a system for routing messages in a communication network, said system including:
a plurality of nodes for receiving a packet for delivery to an intended recipient wherein the system is adapted to determine if the intended recipient is connected to a first selected node within the plurality of nodes and if the recipient is connected to the first selected node deliver the packet and if the recipient is determined not to be connected to the first selected node within the plurality of nodes, the system is further adapted to determine which node from the plurality of nodes the intended recipient is connected and forward the packet to the node to which the intended recipient is connected.

Preferably each node from the plurality of nodes includes a plurality of servers coupled to one another. Suitably each node contains a first server from the plurality of servers, said first server adapted to determine if the intended recipient is connected to at least one server within the plurality of servers on the node. The first server may be adapted to determine if the packet contains a destination address of the node to which the packet should be routed. Preferably the first server is adapted to clear the routing information in the packet on forwarding the packet to the desired destination.

If the message packet does not contain any routing information and the first server determines that the intended recipient is not connected to its node then the first server is adapted to route the message packet to a registry. The registry may include one or more servers. Suitably the registry includes a first server adapted to query at least one database for information regarding the location of the last node to which the intended recipient was connected. If the at least one database contains information on the last known location of the intended recipient the first registry server then forwards the packet to the first server of the identified node. Suitably the registry may consult a plurality of databases either simultaneously or sequentially. The database may be in a single location or distributed throughout the network.

Preferably the plurality of servers in each node and/or each registry may occupy the same physical location. Alternatively the servers within each node and/or registry may be distributed across different locations within the node/registry, in such instance the servers are grouped into clusters.

The packets may include message packets, information packets or presence packets. If the packet is a message packet and the system is unable to determine the location of the recipient the system attempts to deliver the packet in accordance a predetermined rule set. The delivery rules may and can include (but are not limited to) SMS delivery, email delivery and/or delivery through other alternative medium. If the packet is an information packet the system sends back a "not found" error packet to the message originator. If the message packet is a presence packet the system discards the packet.

In a further aspect of the present invention there is provided a method for routing messages in a communication system said method including:
receiving at a first node within a plurality of nodes a packet for an intended recipient;
determining if the intended recipient is connect to the node and if the intended recipient is connected to the node deliver the packet to the intended recipient and if the recipient is not connected to the first node determining which node from the plurality of nodes the intended recipient is connected and forward the packet to the node to which the intended recipient is connected.

The method may further include the step of forwarding the packet to a registry in the event that the step of determining fails to identify the node to which the intended recipient is connected.

The method may also include the step of querying a one or more databases to determine the node to which node the intended recipient was last connected and forward the packet to the node based on the information retrieved form said one or more databases.

Preferably the method includes the step of forwarding the packet to a recipient based on predetermined rules.

BRIEF DESCRIPTION OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

It will be understood that throughout the description the terms "Connect" and "Registry" when utilised in conjunction with the discussion of the system architecture refer to logical server components that handle connectivity of end-users/devices (Connect) and database/persistent data access (Registry). Similarly, the term "Location" is used to signify the "location of a user or device", which is to be termed as a unique identifier for a "Connect" as defined above. This can be, for example, an IP address, but the architecture also covers any other addressing scheme. The term "Database" is also used lightly to refer to a storage of data, and does not imply any specific method of storing data (such as an SQL database), or any specific database management system or product.

Figure 1:
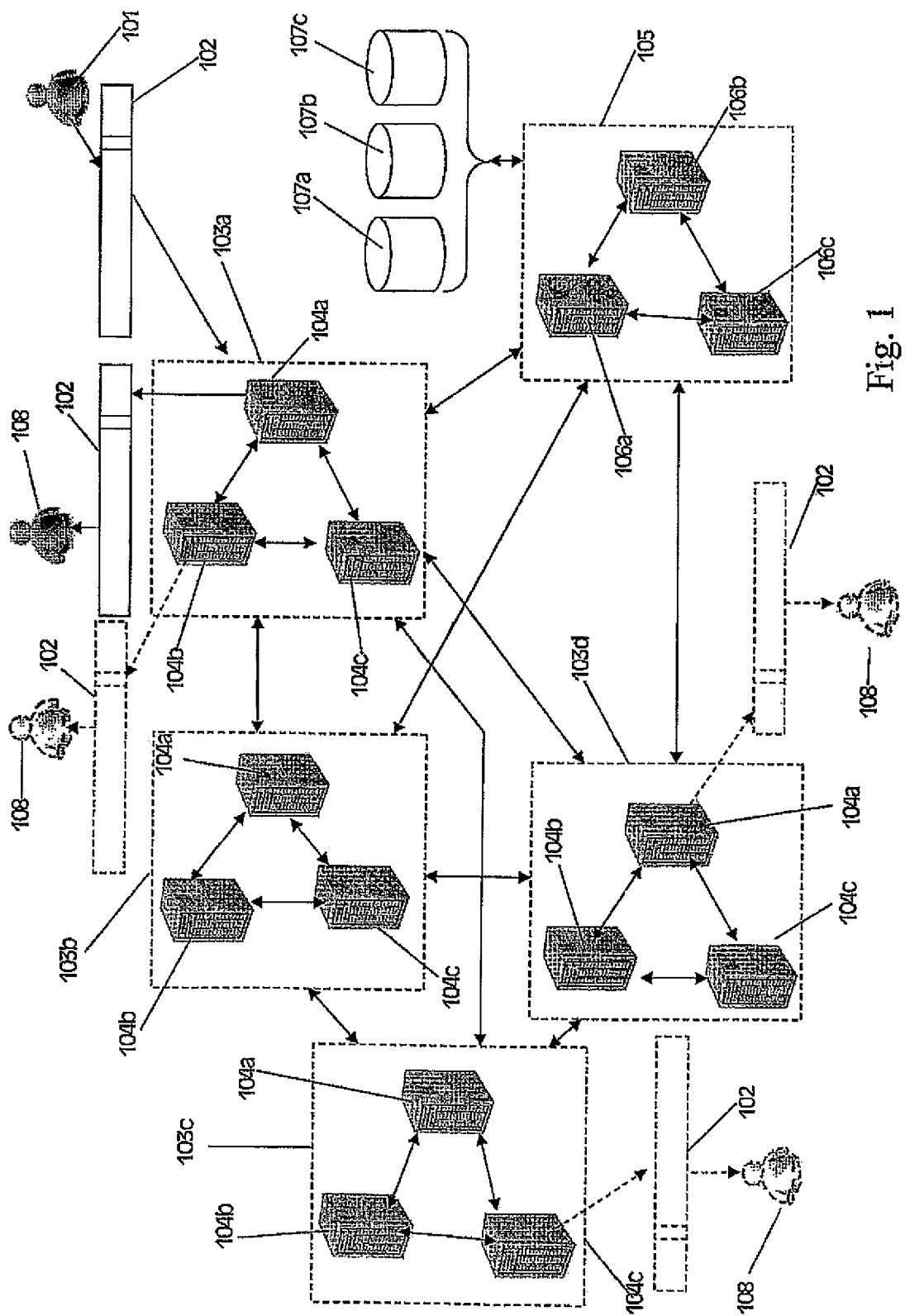
FIG. 1 is a schematic diagram illustrating a system for routing packets according to one embodiment of the present invention.

With reference to FIG. 1 there is illustrated one example of a system 100 for routing a packet 102 according to one embodiment of the present invention. The packets in this particular example can include message packets, information packets and presence packets. If using the XMPP protocol, these correlate to <message>, <iq>, and <presence> stanzas, respectively.

In this example the originating client 101 formats the packet 102 and forwards to a first selected server 104a from a plurality of servers (cluster) 104a, 104b, 104c within first selected node 103a within a plurality of nodes 103a, 103b, 103c and 103d (network) for delivery to an intended recipient 108. Once the packet 102 is delivered to the first server 104a within the selected node 103a, first server 104a determines whether the intended recipient 108 is connected to first server 104a. If the recipient is connected to server 104a then the server proceed to deliver the packet (local delivery) to the intended recipient 108. If the recipient 108 is not connected to a server 104a, 104b, 104c within the cluster then the first server 104a proceeds to check if the packet 102 contains a destination address. For example the packet 102 may specify server 104c in node 103c as the destination address, in which case the server 104a in node 103a routes the packet 102 directly to server 104c within node 103c. It will be appreciated by those of ordinary skill in the art that the packet could be routed indirectly to server 104c within node 103c through the either node 103b, 103d to 103c, a first server 104a within node 103c could then take delivery of the packet 102 before forwarding the packet 102 to server 104c for delivery to the recipient 108.

In the event that the recipient 108 is not connected to a server 104a, and the packet does not contain a specified destination address then server 104a within node 103a forward the packet to a registry 105. For clarity and ease of description the present example is shown to include only one registry 105 it will however be appreciated by those of ordinary skill in the art that the system may include any number of registries 105.

As shown the registry 105 includes a plurality of servers 106a, 106b, 106c (cluster of Registry servers). Once the packet 102 is delivered to a first server 106a from a plurality of servers (cluster) 106a, 106b, 106c, server 106a queries one or more databases 107a, 107b, 107c for information relating to the last known location of the intended recipient 108. If the information on the last location of the intended recipient 108 is available then the first server 106a forward the packet to the server 104a, 104b, 104c within the appropriate node 103a, 103b, 103c and 103d to which the recipient 108 was last connected. In this example the information obtained from databases indicated that recipient 108 was last connected server 104a in node 103d, in which case server 106a forwards the packet 102 to server 104a in node 103d for delivery. In the event the recipient 108 has since shifted location server 104a may then process the packet as discussed above or further routing Further details on the manner in which the routing of packets between various nodes etc is discussed in relation to FIG. 2 below.

In a further embodiment of the present invention the first server 104a on determining that the intended recipient 108 is not connected to the first server 104a, could first conduct a search of the remaining servers 104b, 104c within the cluster contained in node 103a to determine whether the intended recipient 108 is connected to one of the remaining servers 104b, 104c. If the intended recipient is connected to one of the remaining servers 104b, 104c then server 104a forwards the packet to the server (in this case server 104b) to which the recipient 108 is connected. Server 104b then delivers the packet to recipient 108.

As mentioned above the servers within the nodes 103a, 103b, 103c and 103d and the registry 105 are arranged in clusters. The clusters usually consist of a number of servers, having at least one network connection available between them. Thus the servers can be geographically distributed across the service area of the node, provided that the network connection between the servers is available. While the above discussion has drawn a distinction between registry and nodes it will be appreciated by those of ordinary skill in the art that the distinction has been drawn only for clarity of description any cluster of servers within a given node maybe Connect or Registry type cluster.

Figure 2:
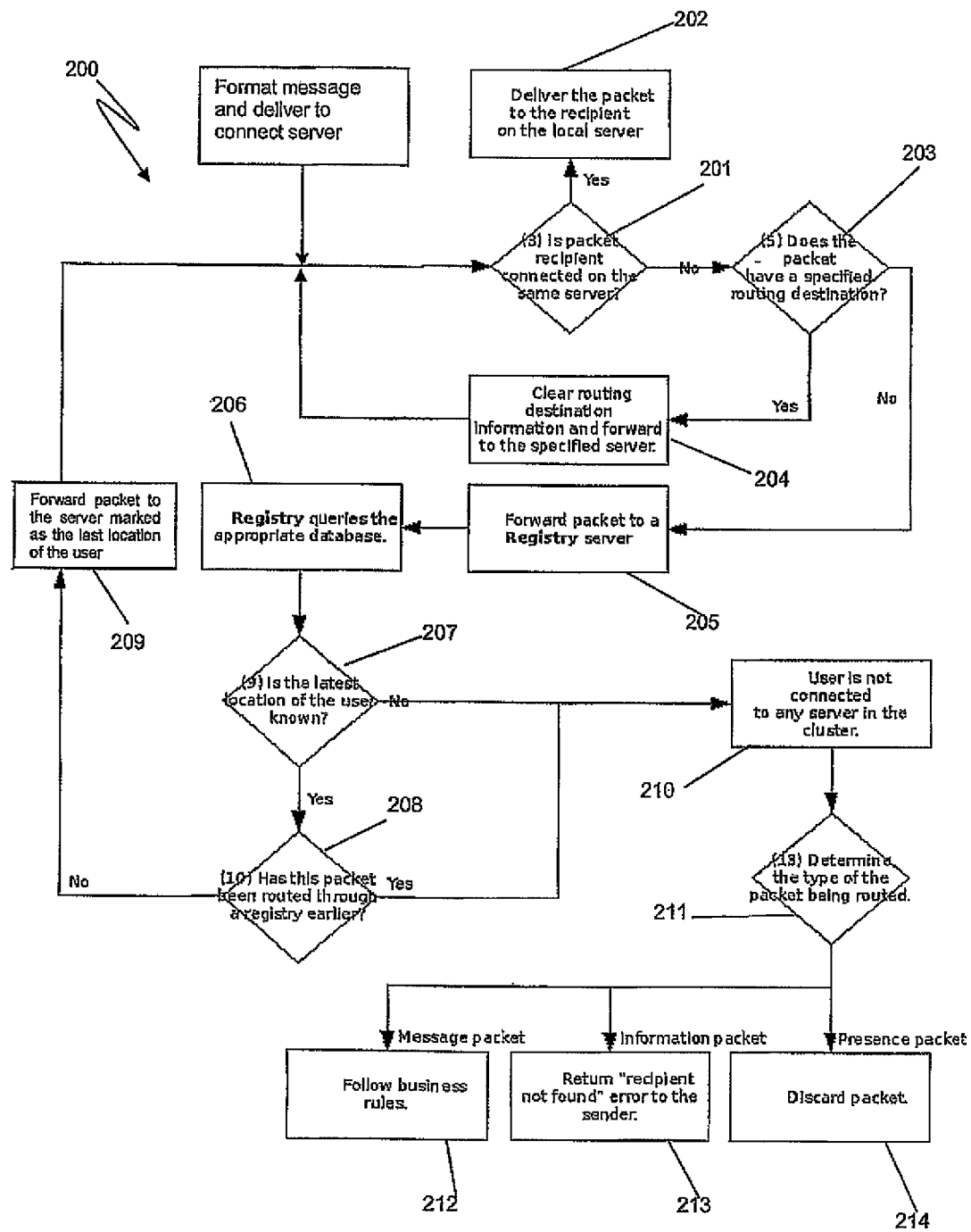
FIG. 2 is a flow chart illustrating the routing process according to one embodiment of the present invention.

With reference to FIG. 2 there is a flow diagram illustrating on example of a routing process that may be employed in the system of FIG. 1 discussed above. Here the packet 102 is formatted and delivered to a "Connect" server 104a within a node 103a. As there are plurality of nodes 103a, 103b, 103c, 103d within the network, the recipient 108 may be connected to any one of the connect servers 104a, 104b, 104c within a cluster of servers contained in a given node. Thus the Connect server 104a handling the packet performs a check 201 to see if the intended recipient is connected locally to the server 104a processing the packet. If this check results to "yes", it means that the packet recipient has been found, and is connected to the server 104a currently handling the processing. Therefore, the server 104a proceeds with local delivery 202 of the packet 102 (i.e. in the case recipient 108 connected to server 104).

If a "no", is returned from the check 201 then the Connect server 104a must initiate a search procedure to determine the location of the intended recipient 203. Under this search procedure the Connect server 104a proceed to check if the packet 102 contains "routing destination" 203. The routing information in this instance is a unique identifier that specifies a given Connect server within a cluster 104a, 104b, 104c (this can be, for example, the IP address of the said server, but other addressing schemes can also be applied) to which the packet should be forwarded. Thus, the sending client can use the optional "routing destination" field in the packet 102 to request routing to a specific Connect server where the client either knows, or can deduce the location or the likely location of the node 103a, 103b, 103c, 103d containing Connect server 104a, 104b, 104c to which the recipient 108 is connected.

If the packet 102 contains routing information the Connect server 104a handling the processing of the packet 102 then forwards the packet 102 to the Connect server 104a, 104b, 104c identified in the routing information. The routing information is then "cleared", or deleted, 204 to prevent the packet 102 from being routed infinitely along the same destination in a loop when the packet is processed by the relevant Connect server within the relevant destination node.

If the destination recipient is not connected to the Connect server 104a doing the processing, and if there is no routing destination specified in the packet 102, the Connect server 104a forwards (step 205) the packet 102 to a selected Registry server 106a within a cluster of registry servers 106a, 106b, 106c in order to ascertain the location of the intended recipient 108. It is up to the Connect server 104a doing the processing to determine a suitable Registry server 106a, 106b, 106c for this using any desired scheme (this could be the nearest Registry server, or the one with the least load, or simply chosen at random from the known available Registries, or any other method).

Once the packet 102 reaches the Registry server 106a, the Registry server 1006a then searches for the recipient data in one or more databases 107a, 107b, 107c (e.g. the recipient's user account etc). The databases 107a, 107b, 107c may be like the Connect and Registry servers be arranged in clusters disturbed throughout the network, thereby allowing recipient data to be saved in more than one database within the network. In such instances all Registry servers 106a, 106b, 106c are configured with the information required to determine where a given user's data is stored, and how to connect to it. Using its configuration information, the Registry server 106 a processing the packet 102 connects to the appropriate database 107a, 107b, 107c (if not connected earlier), and queries the database 206 for the user profile data of the intended recipient 108.

Once the registry server 106a locates the user profile data within the relevant database 107a, 107b, 107c the Registry server 106a then proceeds to check if the latest location of the recipient user account is known 207 ("location" is used here as determined above, this is a unique identifier of a Connect server in a given node within the network). Similarly, "latest location" here refers to the Connect server 104a, 104b, 104c that has most recently served the intended recipient 108. Before forwarding the packet 102 by the Registry server 106a to the last known Connect server 104a, 104b, 104c that last serviced the intended recipient, a further check is performed 208 to determined if the packet has already been forwarded by a Registry server 106a, 106b, 106c to a Connect server 104a, 104b, 104c. If it has, then the packet will not be forwarded again.

In case the packet 102 has not yet been forwarded by a Registry 106a, 106b, 106c the Registry 106a a currently processing the packet tags the packet 102 with information signifying that the packet was forwarded by the Registry server 106a currently processing the packet. The Registry server 106a then forwards 209 the packet 102 to the appropriate Connect server 104a, 104b 104c. The relevant Connect server 104a, 104b 104c then continues processing the packet as described above. Tagging the packet 102 in this manner ensures that next time the packet 102 passes through check 208 that no infinite loop is formed that will bounce the packet between a Registry and a Connect server.

If the location of the recipient cannot be determined by the Registry server 106a then it is concluded that the recipient 108 of the packet is not connected to any Connect server 104a, 104b 104c at present time 210. In a manner of speaking, the intended recipient 108 is "offline". The protocol then determines what class the packet 102 belongs 211 (i.e. message, information or presence). Depending on what type the packet belongs the manner in which the routing process handles the packet differs.

In the case of "Message packet", which are considered "most important", the system will consult a set of routing rules 212, and makes the appropriate decision on the manner in which the packet is then delivered. The routing rules 212 governing the manner in which messages are delivered can include (but are not limited to) SMS delivery, email delivery and/or delivery through other alternative medium.

In case of "Information packets" (which correspond to IQ-stanzas in the XMPP protocol), a "not found" error packet (also commonly referred to as 404 error) is sent back to the sender of the original packet 213. The delivery of the error packet will then also follow the same message routing algorithm described here. The error packet will not be sent in case the original packet already was an error packet (i.e. no error reply will be sent for error replies). This will again prevent an infinite loop from occurring.

In the case of "Presence packets" these packets are considered to be irrelevant in instances where the recipient of the information is not connected to a cluster. These packets are therefore discarded silently without sending any information back to the sender 214.

Figure 3:
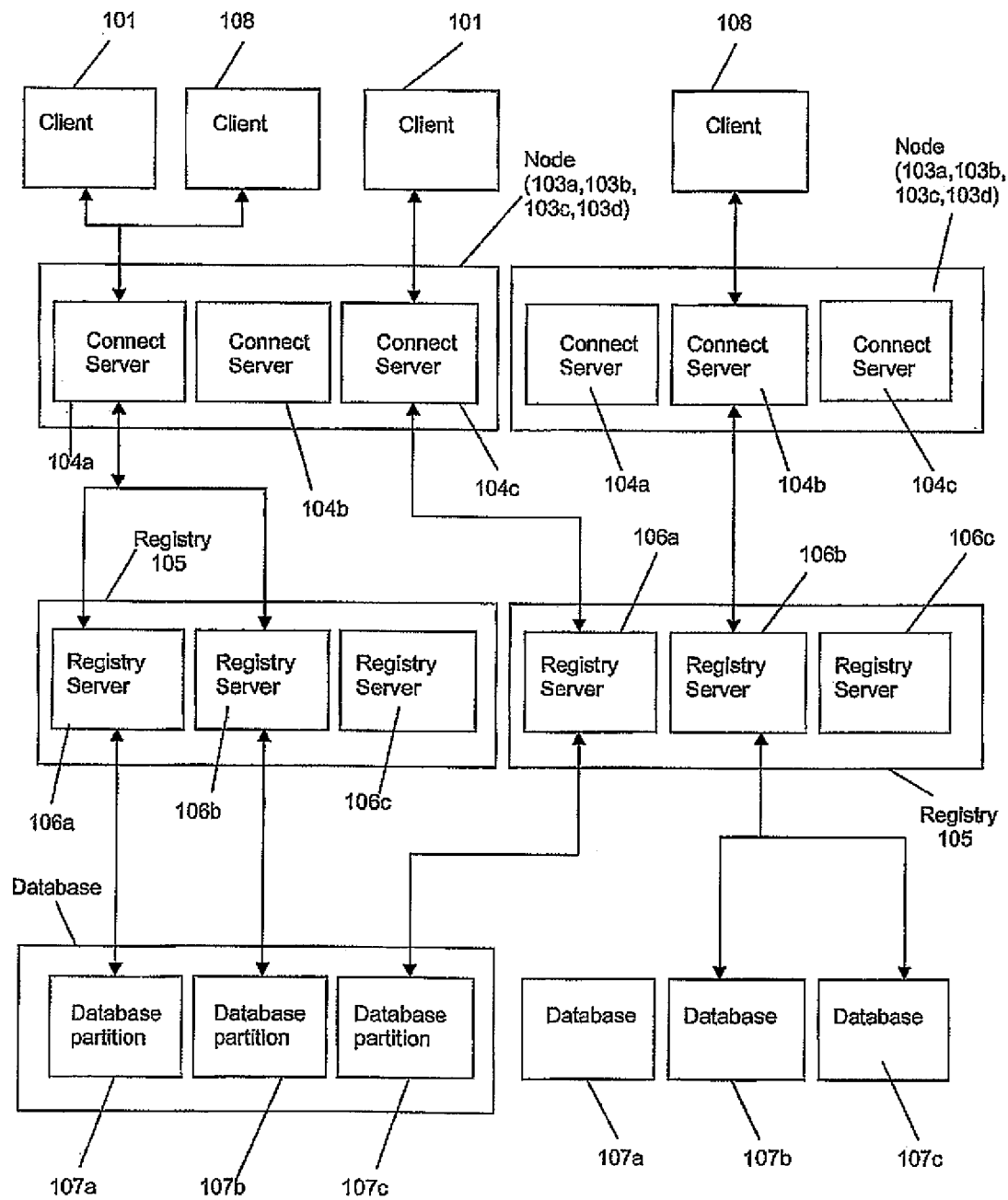
FIG. 3 is a schematic diagram illustrating the connectivity relationships between the network components under the routing process according to one embodiment of the present invention.

As can be seen from the above discussion the routing process according to one embodiment of the present invention covers a networked system consisting of the following major components:
 Client(s) 101,108
 Connect(s) 104a, 104b 104
 Registry(ies) 106a, 106b 106c
 Database(s) 107a, 107b 107c The connectivity relationships between these components are illustrated in FIG. 3. The routing algorithm specifies the following connectivity relationships. Originating 101 and receiving 108 Clients connect only to Connect servers 104a, 104b 104c. As shown one or more clients 101, 108 can connect to one Connect server 104a. Any number of clients can be connected at any given time however one client/user account can only be connected to one Connect server 104a at a time. Any number of Connect servers 104a, 104b 104c can be made available at any given time. Any Connect server can connect to any Registry server 106a, 106b 106c. A Connect server 104a can connect to multiple Registries simultaneously if so required. Any Registry server 106a, 106b 106c can access any Database 107a, 107b, 107c. A Registry can connect to multiple databases simultaneously if so required. Any Registry server can connect to any Connect server (for message forwarding as described above).

"Connect", "Registry" and "Database" are used above as logical components of the system, and they may or may not be deployed on a single physical server, or can be deployed over an array of hardware. Generally, capacity requirements will determine the physical layout of the desired system.

No reliance on a particular database management system or methodology is required by the routing process of the present. In one embodiment of the present invention however the process may utilise a combination of database sharding and replication, which is described in more detail below.

A "Shard" here is used to refer to a "database partition", which represents a way of distributing a large amount of data over several separately installed data storage back-ends. A "data storage backend" here is usually used to refer to a particular server running an RDBMS (Relational Database Management System), however this is not necessarily so, and any method of storing data would be acceptable here.

Figure 4:
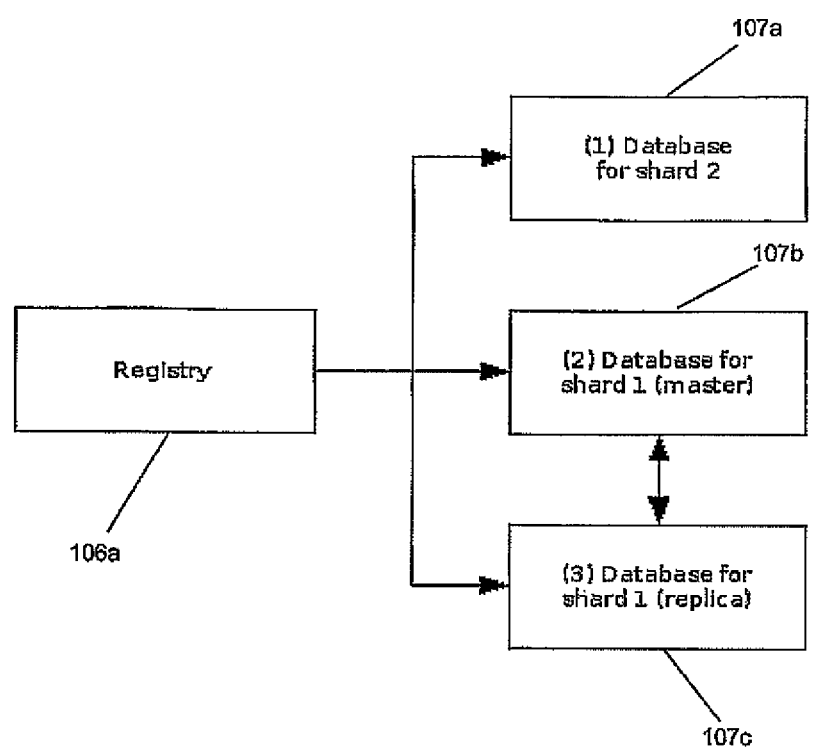
FIG. 4 is a schematic diagram illustrating the process employed by a registry server to locate a data shard according to one embodiment of the present invention.

As shown in FIG. 4, in a shared environment, a Registry server 106a needs to always determine the correct data storage location for any given action, and perform the operation on an appropriate shard. For example, if the shard required is shard "number 2", then the Registry server 106*a* determines that the shard is stored within database 107*a*. Registry server 106*a* then retrieves the shard from database 107*a* and performs the necessary action If the shard required is shard "number 1", and the operation is a read operation, the Registry server 106*a* would determine that either of databases 107*b*, 107*c* contain the relevant shard however, if the shard required is shard "number 1", but the operation is a write operation (addition or modification of data), then Register server 106*a* would then select database 107*b* (assuming the replication is master-slave type). While the selection of shards has been discussed in relation to access to 3 separate databases across which the shards are distributed, it will be appreciated by those of ordinary skill in the art that a single database containing multiple positions may be utilised.

As mentioned above a large database can be partitioned over a number of shards (or "partitions"), for each record in the database, the sharding algorithm determines which partition owns the record. The sharding algorithm can be implemented in various ways, again the exact algorithm should be dictated by scalability requirements. A general guideline for a sharding algorithm could be as follows:

For data relating to a specific user account in the system, first determine the unique identifier for the user account ("user id")
  Calculate a hash of the user id using a suitable hash function ("hash" is a term used in computing terminology, which is often used to refer to a numerical representation of a string, and "hash function" is a function that determines the specific algorithm that provides this representation). This gives you a numerical representation of the user id, which may or may not be numerical in itself.
  Use the hash number as the basis of allocating the shard. If the number of available shards is known, then this can be simply obtained by ways of simple division and noting the remainder. For example:
  1. Given a system with 8 database shards, an
  2. The hash(userid)=8452982
  3. The database shard number that owns this userid records could be 84529823% 8=7 (notation "a % b" here refers to performing the division "a/b" and then retrieving the remainder of the computation
  4. In this case, the database shard would be shard number 7

In addition to the sharding algorithm, another mechanism is required within the system to determine how Registry servers 106*a*, 106*b*, 106*c* are to reach a given shard. Different mechanisms can be configured for reading and writing operations to accommodate database replication in a master-slave configuration (where only one physical server can be written to, but multiple servers can be accessed for read operations).

This mechanism for locating shards can be implemented via simple configuration tables within Registry servers 106*a*, wherein each shard index is configured with the (IP) addresses of servers that can act as database nodes for the given shard. These addresses can be tagged via "read" and/or "write" flags so that a Registry will know where to connect given the database requirement at any given time.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A system for routing messages in a communication network comprising:

a plurality of nodes, each node including a plurality of servers coupled to one another wherein on receipt of a packet, the packet selected from at least one class of a message packet class, an information packet class and a presence packet class, for delivery to an intended recipient by a first server within the plurality of servers of a first node within the plurality of nodes; and the system being operable to, upon determining that the intended recipient is connected to the first server, deliver the packet, upon determining that the intended recipient is not connected to the first server, review the packet for a destination address and forward the packet to the destination address for delivery, and upon determining that the packet does not contain a destination address after review, forward the packet to a registry, wherein the registry is operable to query at least one database to obtain a user profile of the intended recipient and forward the packet to the intended recipient based on information contained in the user profile;

wherein, if the user profile of the intended recipient cannot be determined by the registry, the system is operable to determine the class of the packet from one of the following classes: a message packet class, an information packet class and a presence packet class, and process the packet in accordance with the class of the packet.

2. The system of claim 1 wherein the system is further operable to determine that the intended recipient is connected to a server within the plurality of servers of said first node and deliver the packet to the server, which intended recipient is connected to within said first node prior to determining if the packet contains a destination address.

3. The system of claim 1 wherein the first server from the plurality of servers is operable to clear routing information in the packet upon forwarding the packet to the destination address.

4. The system of claim 1 wherein the registry includes a plurality of servers coupled to one another.

5. The system of claim 1 wherein the plurality of servers of each node are distributed across a number of geographical locations within each node's service area.

6. The system of claim 1 wherein the user profile contains information as to the intended recipient's last known location within the communication network and the packet is forwarded to the last known location of the intended recipient.

7. The system of claim 1 wherein the system is operable to process each packet in accordance with a predetermined rule set for each class in response to the registry failing to obtain the intended recipient's user profile.

8. The system of claim 7 wherein the system is operable to forward the message packets to the intended recipient via an alternate medium specified in the user profile.

9. The system of claim 8 wherein the alternate medium is a Short Message Service (SMS).

10. The system of claim 7 wherein the system is operable to send an error message to a source of the packet for packets assigned to the information packet class.

11. The system of claim 7 wherein the system is operable to discard packets assigned to the presence packet class.

12. The system of claim 1 wherein where the packet is communicated via XMPP protocol, the message packets, information packets or presence packets correlate to <message>, <iq>, and <presence> stanzas respectively.

13. A method for routing messages in a communication system having a plurality of nodes, each node including a plurality of servers coupled to one another, said method comprising:
- receiving at a first server within a plurality of nodes a packet for an intended recipient, the packet selected from at least one class of a message packet class, an information packet class and a presence packet class;
- determining if the intended recipient is connected to the first server and if the intended recipient is connected to the first server, deliver the packet to the intended recipient;
- determining if the packet contains a destination address and forwarding the packet to the destination address for delivery on determining that the intended recipient is not connected to the first server; and
- forwarding the packet to a registry in response to determining that the packet does not contain a destination address, the registry is configured to query at least one database to obtain the intended recipient's user profile, and forward the packet to the intended recipient based on information contained in the user profile;
  - wherein, if the user profile of the intended recipient cannot be determined by the registry, the system is operable to
    - determine the class of the packet from one of the following classes: a message packet class, an information packet class and a presence packet class, and
    - process the packet in accordance with the class of the packet.

14. The method of claim 13 further comprising clearing the destination address in the packet on forwarding the packet to the destination address.

15. The method of claim 13 wherein the step of forwarding the packet by the registry to the intended recipient is based on information as to the intended recipient's last known location within the communication network contained within the intended recipient's user profile.

16. The method of claim 13 further comprising processing each of the packet classes in accordance with a predetermined rule set for each class in response to the registry failing to obtain the intended recipient's user profile.

17. The method of claim 16 further comprising forwarding a packet assigned to the message packet class to the intended recipient via an alternate medium specified in the user profile.

18. The method of claim 17 wherein the alternate medium is a Short Message Service (SMS).

19. The method of claim 17 further comprising sending an error message to a source of the packet for packets assigned to the information packet class.

20. The method of claim 17 further comprising discarding packets assigned to the presence packet class.

21. The method of claim 13 wherein where the packet is communicated via XMPP protocol, the message packets, information packets or presence packets correlate to <message>, <iq>, and <presence> stanzas respectively.

22. A system for routing messages in a communication network comprising:
- a plurality of nodes, each node including a plurality of servers coupled to one another wherein on receipt of a packet for delivery to an intended recipient by a first server within the plurality of servers of a first node within the plurality of nodes; and
- the system being operable to,
  - upon determining that the intended recipient is connected to the first server, deliver the packet,
  - upon determining that the intended recipient is not connected to the first server, review the packet for a destination address and forward the packet to the destination address for delivery,
  - upon determining that the packet does not contain a destination address after review, forward the packet to a registry, wherein the registry is operable to query at least one database to obtain a user profile of the intended recipient and forward the packet to the intended recipient based on information contained in the user profile;
  - wherein upon successfully obtaining the location of the intended recipient based on the user profile, the system is operable to further determine if the packet has already been routed through the registry earlier and if not, tag the packet with information signifying that the packet was forwarded by the registry currently processing the packet.

23. A method for routing messages in a communication system having a plurality of nodes, each node including a plurality of servers coupled to one another, said method comprising:
- receiving at a first server within a plurality of nodes a packet for an intended recipient;
- determining if the intended recipient is connected to the first server and if the intended recipient is connected to the first server, deliver the packet to the intended recipient;
- determining if the packet contains a destination address and forwarding the packet to the destination address for delivery on determining that the intended recipient is not connected to the first server; and
- forwarding the packet to a registry in response to determining that the packet does not contain a destination address, the registry configured to query at least one database to obtain a user profile of the intended recipient, and forward the packet to the intended recipient based on information contained in the user profile;
- wherein upon successfully obtaining the location of the intended recipient based on the user profile, the system is operable to further determine if the packet has already been routed through the registry earlier and if not, tag the packet with information signifying that the packet was forwarded by the registry currently processing the packet.

* * * * *